United States Patent [19]

Cottrell

[11] Patent Number: 4,488,482

[45] Date of Patent: Dec. 18, 1984

[54] METHOD AND APPARATUS FOR EXTRACTING ALOE VERA GEL

[76] Inventor: Thomas A. Cottrell, 2306 Briarwood, Mission, Tex. 78572

[21] Appl. No.: 447,429

[22] Filed: Dec. 6, 1982

[51] Int. Cl.³ .............................................. B30B 9/20
[52] U.S. Cl. ...................................... 100/37; 100/39; 100/97; 99/538; 83/874
[58] Field of Search ................ 100/37, 39, 121, 159, 100/168, 96, 97, 118; 83/870–874; 99/509, 537, 538, 540, 567, 568, 584, 536, 635; 198/624

[56] References Cited

U.S. PATENT DOCUMENTS 3,976,498  8/1976  Tilby et al. ................... 198/624 X
4,395,942  8/1983  Thompson ........................ 100/37

Primary Examiner—Peter Feldman
Attorney, Agent, or Firm—Thomas L. Cantrell; Warren B. Kice; Stanley R. Moore

[57] ABSTRACT

Disclosed are methods and apparatus for extracting gel from aloe vera leaves without contaminating the gel with toxic juices indigenous to the husks of the leaves. Further, this mechanized extraction is uniquely suited to permit frequent cleaning of the machinery. The leaves are washed, trimmed, and introduced into means for feeding the aloe vera leaves to and through a blade which longitudinally bisects the leaves. The split leaves are then passed through pressing rollers which advance the husks but retain the gel which falls from the pressing rollers into a collection pan. The pressed husks shed additional gel as they are carried over a further expanse of the collection pan and are then transferred to a husk collection conveyor which carries the husks back under the machinery. The pressing rollers are mounted to the frame of the apparatus by a hinged block which permits the pressing rollers to be swung open to permit cleaning of the pressing rollers and the blade. Further, it is preferred that the drive train of the pressing rollers disengage when the system is opened for cleaning to prevent injury to the operators during cleaning.

7 Claims, 6 Drawing Figures

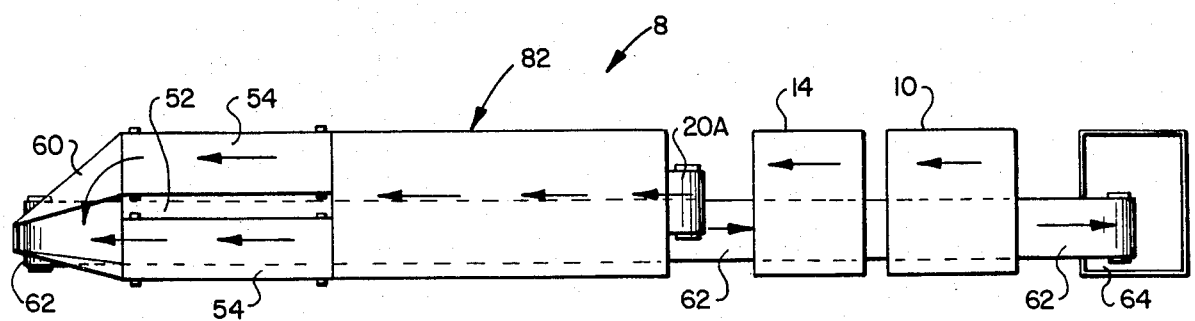
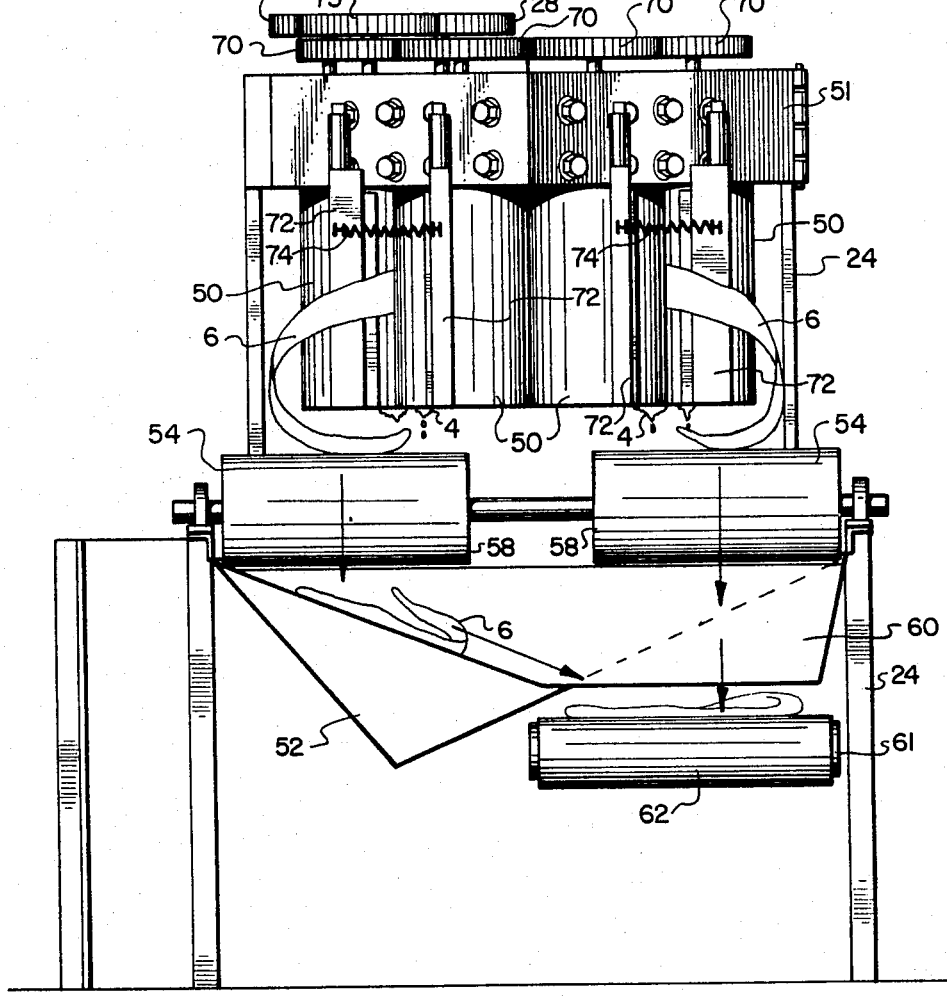
FIG. 4

METHOD AND APPARATUS FOR EXTRACTING ALOE VERA GEL

BACKGROUND OF THE INVENTION

The leaves of aloe vera plants enclose a thick inner liquid or gel within fibrous husks. In recent years, aloe vera gel has become popular in many applications for health and beauty aids and this growing commercial importance has resulted in a need for efficient means for extracting the gel from the leaves of aloe vera plants. Nevertheless, the aloe vera crop is still often processed by hand. Difficulties of mechanization are further complicated by the fact that the fibrous husks contain toxic juices that can contaminate the loose gel if the husks are processed by conventional systems. Further, mechanization of the extraction process must emphasize cleanliness with respect to the collected gel and provide for efficient disposal of the husks remaining after extraction.

SUMMARY OF THE INVENTION

The first step in extracting the aloe vera gel from harvested leaves is to wash the leaves. Then, the ends of the tubular leaves are trimmed and the leaves are introduced into a means for feeding the aloe vera leaves to a means for cutting those leaves longitudinally in half. In the preferred embodiment, the means for cutting the leaves is a stationary blade affixed to a frame of the device and the means for feeding the leaves into the blade includes driving means, a pair of synchronized feeding belts or conveyors and feeding rollers.

In the preferred embodiment, one motor is linked to drive each of these elements as well as other elements introduced hereafter. This versatility is achieved with a conventional transmission of chains, sprockets, gears, belts and shafts, these elements and their combination being well known in the art unless otherwise noted. A conventional alternative comprises a single hydraulic pump operating a group of satellite hydraulic motors.

The first of this pair of feeding belts extends from an upstream vertical roller or drum to a downstream verticle roller. However, the upstream end of the second feeding belt begins horizontally but twists to converge with the first feeding belt as it extends toward a second downstream vertical roller adjacent the downstream vertical roller of the first feeding belt.

The leaves are placed onto the horizontal upstream portion of the second feeding belt and the second feeding belt converges with the first to hold the leaves between the synchronized feeding belts and which advance vertically. At the downstream end of these feeding belts is the pair of vertical feeding rollers which grasp the aloe vera leaf as it emerges from between the feeding belts and feeds the elongated tubular leaf endwise to and through a vertically oriented cutting edge of a blade.

The cutting edge splits the leaf lengthwise and feeds opposing sections between paired pressing rollers which advance the husks yet retains the greatest portion of the gel which falls from the pressing rollers to the collection pan therebeneath. In the preferred embodiment two pairs of pressing rollers are used, one to receive and press each of the opposing halves of the longitudinally bisected aloe vera leaves.

The pressed husks are then fed to a husk collection conveyor which continues to carry the husks over a collection pan to collect remaining drippings of the aloe vera gel off those husks and thereafter expels the husks onto a slide which transfers the husks to a final collecting conveyor which carries the husks under the machine to a collection facility The present invention uses pressing rollers that are mounted on a block which is hinged upon the frame in a swing-away formation that opens up the pressing rollers and blade to facilitate easy cleaning. In addition, the present invention promotes safety by assuring that the drive train for these rollers is disengaged during the cleaning process. In the preferred embodiment, each of the pressing rollers grouped into the two pairs are synchronized by interconnection of driving gears on a one-to-one ratio and one of these gears links with a drive means only when the pressing rollers are in the closed position.

Cleaning is a particularly frequent occurrence because of the thick, sticky nature of the aloe vera gel and the particular requirements of processing where aloe vera gel needs to be collected for the preparation of health and beauty aids with a minimum of further processing.

Further, the present invention has facilitated the collection of husks by arranging the collection pan such that a husk collection conveyor belt returns therebeneath to provide for the return of husks underneath the train of machinery discussed above. This co-linear arrangement of the processing system with a return of the waste products underneath the same facilities provides a significant advantage when several machines are used in a processing facility. In the case of industrial processing with a number of machines, this return of the husks best provides for the movement of people around the downstream end of the processing equipment. In particular, it eliminates a transverse collection of husks which prevents movement around the cutting and pressing operations of the downstream end of the machine and further delivers the expended husks where the same equipment that brings in the raw harvested aloe vera leaves also carries away the waste product, the husks.

BRIEF DESCRIPTION OF THE DRAWINGS

FIG. 2 is a schematic representation of an over-head view of an aloe vera extraction machine of the present invention;

FIG. 4 is an end elevational view of the downstream end of an aloe vera extraction machine of the present invention;

A DETAILED DESCRIPTION OF THE DRAWINGS

Figure 5:
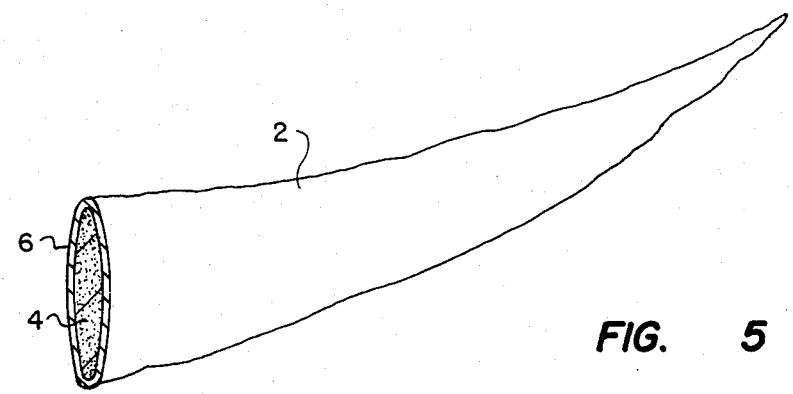
FIG. 5 is is a perspective view of a harvested aloe vera leaf.

A typical harvested aloe vera leaf is illustrated in perspective view in FIG. 5. Leaves 2 of aloe vera plants enclose a thick inner liquid or gel 4 within the fibrous external husks 6. In recent years, the aloe vera gel has become popular in many applications of health and beauty aids and this growing commercial importance has resulted in a need for efficient means for extracting the gel from the leaves of the aloe vera plant.

Traditional mechanized processing equipment removes valuable fluid material from the raw plant material by very harsh pressing and grinding operations that masticate the skins, rinds, hulls, or husks that enclose the desired fluid. However, these conventional approaches are inapplicable to the aloe vera harvest because the fibrous husk of the aloe vera plant contain toxic juices which must not be allowed to mix with the medicinal gel collected. Thus an appropriate mechanzied extraction process must provide for rapid and efficient removal of the gel without excessive cutting or crushing of the fibrous husks that would release appreciable quantities of the toxic juice and thereby contaminate the aloe vera gel during separation and collection. Further, the current dominant commerical application for aloe vera gel is in "natural" health and beauty aids. However, even if aloe vera gel is but one ingredient in a complex mixture, the commerical preparation of aloe vera gel emphasizes minimal processing and the wholesale market disfavors chemical and even temperature processing. Thus, this perishable must be collected in operations with high standards of cleanliness.

Figure 1:
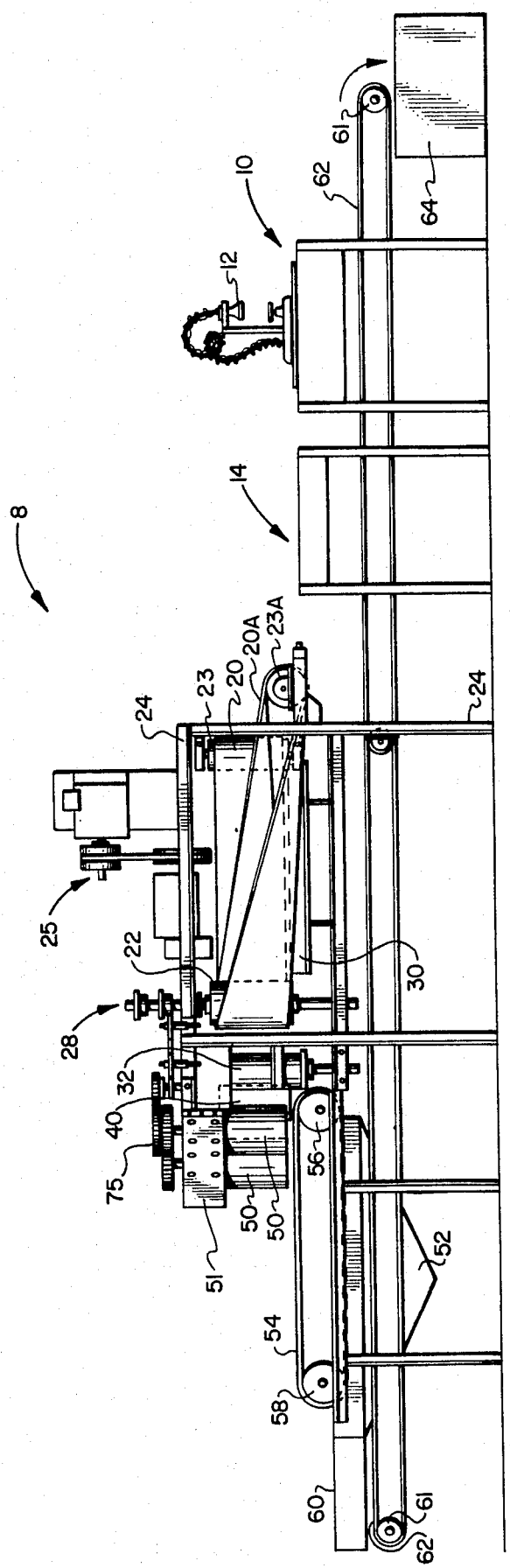
FIG. 1 is a side-plane view of an aloe vera gel extraction machine of the present invention.
Figure 3:
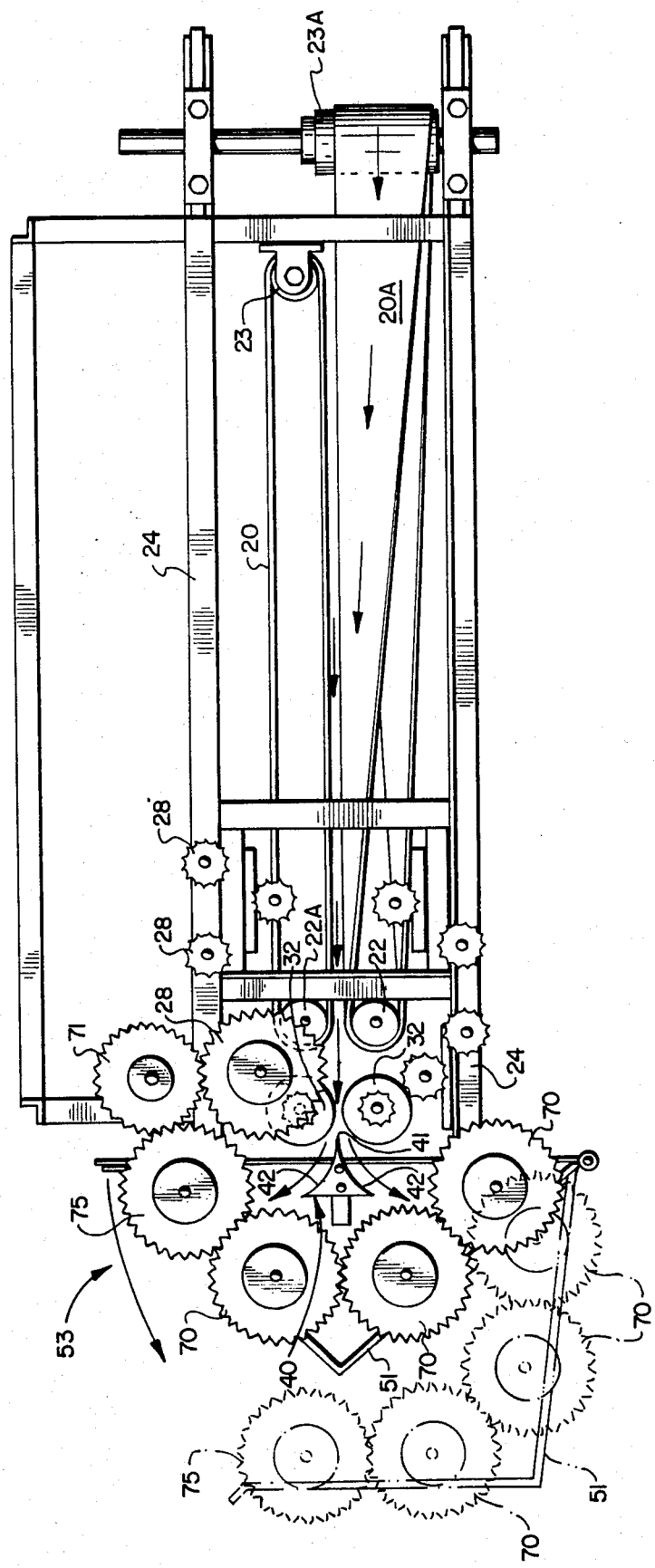
FIG. 3 is a top view of the aloe vera extraction machine of the present invention illustrating in broken outline the swing-away position of the pressing rollers.

FIG. 1 illustrates aloe vera extraction system 8. In this preferred embodiment, wash basin 10 and cutting block 14 are separate from frame 24 which supports the feeding, cutting, pressing, and collecting elements. Drive means 25 and transmission 28 are attached to frame 24. Vertical driven roller 23 is rotatably attached to the upstream end of frame 24 and is paired with a first vertical driving roller 22A which is rotatably attached to frame 24 downstream of the vertical driven roller and linked to drive means 25 through transmission 28. Roller 22A is obscured in FIG. 1 by roller 22 which is directly in front thereof within the view. Feeding rollers 32 discussed below are similarly paired and attention is generally directed to the overhead view of FIG. 3 in instances where the laterel view of FIG. 1 does not best illustrate an element. Plate 30 is connected to frame 24 beneath feeding belts 20 and 20A. Further down the processing stream from driving roller 22 are feeding rollers 32 which are rotatably connected to frame 24 and are linked to drive means 25 through transmission 28. Immediately downstream of feeding rollers 32 is blade 40 having cutting edge 41 and flanges 42. These latter elements of blade 40 are illustrated in FIG. 3. And further downstream from blade 40 are pressing rollers 50 which are rotatably attached to block 51 which is hingedly connected to frame 24. The arrangement of the pressing rollers is best illustrated in the overhead view of FIG. 3 even though the rollers themselves are obscured from view with one positioned beneath each of gears 70.

Collection pan 52 is mounted to frame 24 beneath pressing rollers 50 and pan belt 54 is mounted beneath pressing rollers 50 but above collection pan 52 on rollers 58 and 56 which are linked to drive means 25 through transmission 28. See FIGS. 1 and 4. Slide 60 is connected to frame 24 and extends from the downstream end of pan belt 54 to the upstream end of husk collection conveyor 62 which operates on rollers 61 connected to frame 24 and at least one of which is connected to drive means 25 through transmission 28. Husk collection conveyor 62 runs underneath the previously discussed elements of aloe vera extraction system 8 to expel depleted husks into collection bin 64. The relation of each of these elements will be fully discussed in connection with FIGS. 1, 2, 3, and 4.

See also the top view of aloe vera extraction system 8 in FIG. 3. In FIG. 1 the first vertical driving roller 22A is not visible because it is directly behind vertical driving roller 22 which is also rotatably attached to frame 24 and linked to drive means 25 through transmission 28. First feeding belt 20 extends from vertical driven roller 23 downstream to the second vertical driving roller 22A.

A second feeding belt 20A extends from horizontal driven roller 23A which is rotatably attached to the upstream end of frame 24. A second feeding belt, feeding belt 20A extends from horizontal driven roller 23A to feeding belt 20.

The first step in extracting the aloe vera gel from harvested aloe vera leaves is to wash the leaves. In the preferred embodiment of FIG. 1, wash basin 10 is illustrated having water source 12. After washing the leaves, personnel operating the system of the preferred embodiment pass the leaves from the washing step to the trimming step, there trimming the top and bottom ends of the elongated tubular leaves with knives or other conventional means. In this figure, the trimming stage occurs at cutting block 14.

The elongated leaves are then introduced into a means for feeding the leaves to the cutting step. In the preferred embodiment, best illustrated in FIGS. 1 and 3, the leaves are placed longitudinally on the up-stream, horizontal end of second feeding belt 20A. This second feeding belt carrying the aloe vera leaf converges with the first feeding belt 20 downstream, and the two synchronized belts feed the aloe vera leaf into paired, synchronized vertical feeding rollers 32 which advance the leaves through blade 40.

The cutting means of the preferred embodiment, blade 40, is stationary and the feeding means presents and push the leaves through the blade. Drive means 25 which includes motor 26 attached to frame 24 and various conventional belt drives, shafts, chains, sprockets and gears, designated generally as transmission 28, provides a source of rotary power for the entire system. Except as otherwise noted, motor 26 and transmission 28 are of conventional configuration and well known in the art. Further it should be noted that alternative conventional drive means are possible such as the use of a hydraulic pump instead of a motor and transmission of power through fluid lines to a group of satellite hydraulic motors which drive the various rollers.

Feeding belt 20 is mounted between a driven roller 23A which is horizontally rotatably mounted to frame 24 at the upstream foot of said feeding belt and a vertically oriented driving roller 22 at the downstream head of the feeding belt. Feeding belt 20A is paired with feeding belt 20 which is vertical from its upstream end at vertical driven roller 23 to its downstream end at vertical roller 22A. The paired feeding belts 20 and 20A carry leaves placed on the horizontal foot portion of feeding belt 20A and translates to a vertical head portion of that moving belt at which point the belts are sufficiently close in proximity to prevent an aloe vera leaf then pressed between them from falling. Even so, plate 30 is positioned beneath the feeding belts to catch the stray leaves. Transmission 28 carries rotation from motor 26 to driving rollers 22 and 22A which move feeding belts 20 and 20A in a manner which draws aloe vera leaves placed upon the feeding belt upstream of the driven rollers 23 and 23A to and ultimately through the paired driving rollers 22.

Emerging from between the vertically oriented feeding belts between driving rollers 22 and 22A, the aloe vera leaves are fed into feeding rollers 32. Feeding rollers 32 are vertically mounted driven rollers similar to driving rollers 22 which pull the feeding belts and both are linked to a driving means 25 for a source of rotary power. Feeding rollers 32 longitudinally feed aloe vera leaves to blade 40 which is also fixed to frame 24. Blade 40 is vertically oriented with cutting edge 41 presented between twin feeding rollers 32. Thus an aloe vera leaf which is firmly advanced between the feeding rollers is expelled directly into the cutting edge of the blade and the split sections are then diverted by a widened rear portion of the blade, flange 42. Each longitudinally split half of the aloe vera leaf is deflected off wedge 42 to be fed into a set paired pressing rollers 50.

The overhead view of FIG. 3 best illustrates this portion of the apparatus and the movement of the aloe vera leaves is designated by arrows beginning at the downstream end of the feeding belts at driven rollers 23 and 23A. The designated movement continues downstream past driving rollers 22 and 22A where feeding belts 20 and 22A present aloe vera leaves to feeding rollers 32 which feed the split leaves through pressing rollers 50. There the leaf is split by blade 40 and the halves are deflected by flanges 42 at the back of blade 40 to enter rollers 50. Pressing rollers 50 are obscured from view in the overhead illustration of FIG. 3 beneath gears 70. Compare FIGS. 1 and 4.

Bisected longitudinally, each half of the leaf loosely carries a mass of exposed gel on the fibrous husk. Paired pressing rollers 50 are calibrated to exert sufficient pressure on the open husk that the gel is pressed out and separated while the husk passes through the rollers. However, an insufficient pressure is exerted to extract the toxic juices indigenous to the husks.

Referring now to FIG. 4, liberated gel 4 drips from the upstream or feeding side of pressing rollers 50 into collection pan 52 positioned beneath the pressing rollers. Wiper blades 72 shown in FIG. 4 are mounted on block 51 and held against the pressing rollers 50 by means such as springs 74. The wiper blades scrape gel of the pressing rollers to facilitate the collection of the gel in collection pan 52. Further, substantially processed husks 6 thus separated from the bulk of gel 4 are expelled downstream from pressing rollers 50 onto paired pan belts 54 which are connected to drive means through at least one of rollers 56 or 58 about which the pan belt is wrapped. Referring to both FIGS. 1 and 3, pan belt 54 carries the husks over further expanse of the collection pan 52 and permits gel remaining on the surface of these husks to drop into collection pan 52. At the downstream end of pan belt 54 the husks, now substantially separated from the gel, are dropped onto slide 60 and thereby transferred to husk collection conveyor 62. Husk collection conveyor 62 carries depleted husks back underneath the train of machinery to a collection facility, here collection bin 64.

FIG. 4 illustrates an end view of pan belt 54, collection pan 52, slide 60 and husks collection conveyor 62. This particular configuration of collection pan 52 is very useful because it permits a return conveyor belt, here husk collection conveyor 62 to return under the machinery yet provides a collection pan 52 of a very substantial volume for collecting aloe vera gel. The depth of the pan is off-center to permit collection of the husks to proceed underneath the machinery yet at the same time provides sufficient clearance under the conveyor belt above the factory floor to allow adequate clean-up. Another constraint in this positioning is that the cutting and pressing operations must be undertaken at a height that is within easy reach for cleaning of the machinery itself.

Figure 6:
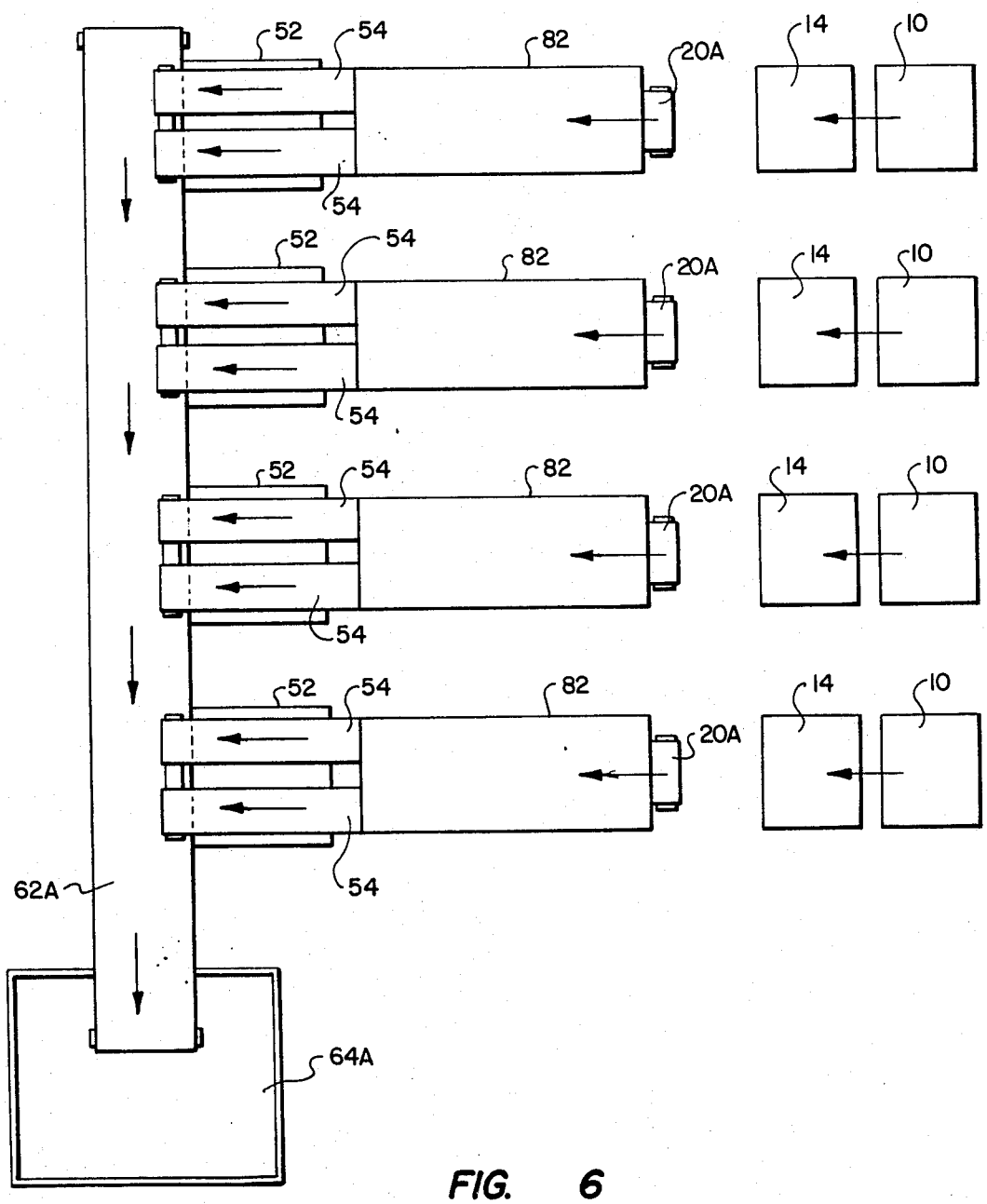
FIG. 6 is a schematic representation of an array of processing lines of conventional configuration for waste disposal.

FIG. 2 best illustrates the system approach which allows a long process line without cumbersome operations lateral to this progression of work. Compare the system of the present invention with FIG. 6. Thus, FIG. 2 illustrates this system starting with washing the leaves at wash basin 10, trimming the tips of the leaves at cutting block 14 and feeding the trimmed leaves onto feeding belt 20A at the horizontal foot of that belt. Feeding belt 20A brings the leaves into the cutting and pressing stages described in detail above and designated generally as processing stages 82 in this figure. The gel is collected in accordance with the discussion above and the husks are expelled from processing stages 82 to pan belts 54 over collection pan 52. At the downstream end of pan belts 54, the husks are emptied onto slide 60 which transfers the husks to collection conveyor 62 which returns the husks underneath system 8 to empty spent husks into collection bin 64. The return of the husks under the machinery permits the fullest access at the cutting and pressing equipment at the final end of aloe vera gel extracting equipment. Thus compare FIG. 2 with FIGS. 4 and 5 which show end and lateral views of the husk collection conveyor, respectively.

In larger processing facilities it is desirable to have a number of processing lines working together and constraints of space and movement of materials are greatly advanced by the present invention which arranges processing lines in parallel arrays each having uniform downstream and upstream orientation. Compare the use of an array of systems shown in FIG. 2 with the same equipment placed in a conventional array as in FIG. 6. This equipment is numbered consistently with the equipment shown in FIG. 2 and thus each processing line has wash basins 10, cutting blocks 14 for trimming the ends of the aloe vera leaves, feeding belts 20A, processing stages 82, and pan belts 54 over collection pans 52. However, in the conventional arrays pan belts 54 empty directly onto transverse collection belt 62A which empties into collection bin 64A. In the conventional array the collection of spent material is lateral to this array of longitudinal processing lines and this creates a very significant problem in that operating personnel have to step and reach over the husks collection conveyor in order to gain access to the pressing rollers and blade which require frequent cleaning. This awkardness is particularly objectionable when dealing with moving machinery as is the case here. Thus, returning the husks beneath the processing line result in substantial savings of effort on the part of operators and significantly increases the safety of the system.

To further facilitate cleaning, FIG. 3 illustrates swing-away provisions for mounting pressing rollers 50. As discussed above, pressing rollers 50 are not visible in this illustration as each is aligned directly beneath one of gears 70. Further, one of gears 70 is similarly obscured by synchronized gear 75. Refer also to FIG. 4. Pressing rollers 50 are mounted to block 51 which is hingedly attached to frame 24 to permit the block to swing the pressing rollers between two positions.

In operation, pressing rollers 50 are presented to receive longitudinally bisected husks deflected off flanges 42 of blade 40 when the block is in a closed position. Further, in the closed position drive train 53 for pressing rollers 50 links to transmission 28 to be powered by motor 26.

In the preferred embodiment of the drive train, gears 70 interconnect all the pressing rollers in which the pairs rotate into each other to grasp bisected leaves from the blade on the upstream side and pass the hulls through the downstream side. When block 51 is in the closed position gear 75 linked to one of gears 70 meshes with driving gear 71 which is linked to conventional transmission 28.

In the open position, drive train 53 which drives rollers 50 in synchronous rotation disengages from transmission 28 so that the blade and rollers may be cleaned with the assurance that the machinery will not be in motion. Thus in the preferred embodiment, gear 75 disengages from driving gear 71 upon opening the block. This provides full access to the blade and pressing rollers. Further, less frequent major clear up or maintenance is facilitated by mounting the pressing rollers vertically to permit their removal by releasing them to drop from place on the block.

Having described the invention in connection with certain specific embodiments thereof it is to be understood that further modifications may now suggest themselves to those skilled in the art, and it is intended to cover such modification as followed in the scope of the appended claims.

I claim:

1. A device for extracting aloe vera gel from within the fibrous husks of harvested aloe vera leaves, said device comprising:
   a frame;
   a blade connected to said frame;
   drive means for a source of rotary power attached to said frame;
   means for feeding said aloe vera leaves to and through said blade whereby said leaves are longitudinally bisected to expose the gel over substantially the entire length of each leaf, said means for feeding connected to said frame and linked to said drive means;
   a block hingedly mounted on said frame;
   twin pairs of pressing rollers, said pressing rollers rotatably mounted on said block, said block having a first position which links said pairs of pressing rollers to said drive means and presents said pairs of pressing rollers in position to receive opposing halves of said longitudinally bisected aloe vera leaves, whereby said longitudinally bisected aloe vera leaves are pressed between rollers which advance the husks through the rollers but do not pass the gel, and further, said block having a second position disengaged from said drive means in which said pressing rollers are swung away from said blade whereby said pair of pressing rollers and said blade are accessible for safe cleaning; and
   means for collecting said aloe vera gel while separating from said husks at said pressing rollers.

2. A device in accordance with claim 1 for extracting aloe vera gel from within the fibrous husks of harvested, trimmed and washed aloe vera leaves, said device further comprising:
   said means for collecting said aloe vera gel further comprising:
      a collection pan connected to said frame beneath said pressing rollers; and
      a plurality of wiper blades attached to said block and held in compressive contact with the surface of said pressing rollers whereby the aloe vera gel carried on said rollers is scraped off said pressing rollers to fall into the collection pan;
      a pan belt rotatably connected to said frame and linked to said drive means and positioned to receive husks expelled through said pressing rollers whereby said husks are carried over a further expanse of said collection pan;
      whereby the majority of aloe vera gel is separated from said husks at said pressing rollers and is scraped off the pressing rollers to fall into said collection pan and residual gel not separated at said pressing rollers is transported with said husks across said collection pan such that additional gel falling free of said husks enters the collection pan; and
   means for collecting said husks for disposal, said means comprising:
      a slide connected to said frame receiving husks from the terminal end of said pan belt;
      a raised trough recessed into the bottom of said said collection pan;
      a husk collecting conveyor receiving said husk from said slide in carrying said husks beneath said trough and underneath the length of said device for collection.

3. A device for extracting aloe vera gel from within the fibrous husks of an aloe vera leaf, said device comprising:
   means for washing harvested aloe vera leaves, said means for washing being positioned at a first end of said device;
   means for trimming the ends of the aloe vera leaves, said means for trimming being positioned adjacent said means for washing;
   a frame;
   a blade connected to said frame, said blade having a vertically oriented cutting edge and outwardly diverting rearward vertical flanges;
   a motor attached to said frame;
   a transmission attached to said frame and linked to said motor;
   means for feeding said aloe vera leaves to said blade, said means for feeding comprising:
      an upstream horizontal driven roller rotatably attached to said frame adjacent said means for trimming;
      an upstream vertical driven roller rotatably attached to said frame adjacent said means for trimming;
      a first downstream vertical driving roller rotatably attached to said frame and linked to said motor through said transmission;
      a first feeding belt extending from said upstream vertical driven roller to said first downstream vertical driving rollers;
      a second downstream vertical driving roller rotatably attached to said frame adjacent said first downstream vertical driving roller and linked to said motor through said transmission;
      a second feeding belt, said second feeding belt extending from said upstream horizontal roller to said second downstream vertical roller and converging with said first feeding belt whereby aloe vera leaves are securely held and advanced between said first and second feeding belts over vertical expanse of said feeding belts;

a pair of adjacent vertically oriented feeding rollers rotatably attached to said frame immediately at the head of said feeding belts and linked to said motor through said transmission, said feeding rollers being positioned to feed said aloe vera leaves longitudinally into the cutting edge of said blade;

whereby said leaves are pushed through said blade and are longitudinally bisected to expose the gel over the entire length of each said leaf;

a block hingedly mounted on said frame;

twin pairs of pressing rollers, said pressing rollers rotatably mounted on said block, said block having a first position which links said pressing rollers through said transmission to said motor and presents said pairs of pressing rollers in position to receive opposing halves of said longitudinally bisected aloe vera leaves as said halves are deflected off the flanges of said blade and whereby said longitudinally bisected aloe vera leaves are pressed between rollers which advance the husk through the pressing rollers but do not pass the gel, and further, said block having a second position disengaged from said transmission and in which said pressing rollers are swung away from said blade whereby said twin pairs of pressing rollers and said blade are accessible for cleaning; comprising:

a collection pan positioned beneath said pressing rollers;

a plurality of wiper blades attached to said block and held in compressive contact with the surface of said pressing rollers whereby aloe vera gel carried on said rollers is scraped off the pressing rollers to fall into the collection pan;

a pair of pan belt rollers rotatably attached to said frame, at least one of said pan belt rollers being linked to said motor through said transmission and;

a pan belt connected to said frame and linked to said motor through said transmission and positioned to receive husks expelled through said pressing rollers, whereby said husks are carried over a further expanse of said pan;

whereby the majority of aloe vera gel is separated from said husks at said pressing rollers and is scraped off the pressing rollers to fall into said collection pan and residual gel not separated at said pressing rollers is transported with said husks across said collection pan such that additional gel falling free of said husks enters said collection pan; and means for collecting said husks for disposal, said means comprising:

a slide receiving said husks from the terminal end of said pan belt;

a raised trough recessed into the bottom of said collection pan; and a husk collecting conveyor receiving said husks from said slide and carrying said husk beneath said raised trough and underneath said device for collection.

4. In a device for extracting aloe vera gel from within fibrous husks of aloe vera leaves that have been washed and trimmed at the terminal ends, said device being of the type having a frame, a means for cutting said aloe vera leaves in longitudinal bisection which is connected to said frame, a drive means attached to said frame, means for feeding said aloe vera leaves to said means for cutting whereby said leaves are pushed through said blade and are longitudinally bisected to expose the gel over the length of the leaf, a collection pan connected to said frame for receiving said aloe vera gel, the improvements comprising:

a block hingedly mounted on said frame;

a pair of pressing rollers rotably mounted on said block, said block having a first position which links said pressing rollers to said drive means and which presents said pair of pressing rollers into position to receive the aloe vera leaves after passing said means for cutting whereby said longitudinally bisected aloe vera leaves are pressed between said pair of rollers which advance the husks through the rollers but substantially retain the gel, and further, said block having a second position disengaged from the said drive means and in which said pressing rollers are swung away from said blade whereby said pressing rollers and said blade are safely accessible for cleaning.

5. In a device for extracting aloe vera gel from aloe vera leaves in accordance with claim 4 wherein said means for cutting said aloe vera leaves is a stationary blade connected to said frame, the further improvements comprising:

means for collecting said husks for disposal, said means comprising:

a slide receiving said husks from the terminal end of said pan belt;

a raised trough recessed into the bottom of said collection pan;

a husk collecting conveyor receiving said husks from said slide and carrying said husks beneath said raised trough and underneath said device for collection.

6. A method for extracting aloe vera gel from within fibrous husks of aloe vera leaves said method comprising the following steps;

washing the harvested aloe vera leaves;

trimming the ends of the aloe vera leaves;

feeding washed and trimmed aloe vera leaves to and through a blade whereby the leaves are longitudinally bisected to expose the gel over entire length of each leaf;

pressing the longitudinally bisected leaves in paired pressing rollers which advance the husks through the rollers but do not pass the gel;

collecting the gel separated from said husks at said pressing rollers into a collection pan collecting said husks for disposal; and frequently cleaning the processing equipment by swinging a hinged block upon which said pressing rollers are rotatably mounted away from said blade thereby permitting access to the blade and the pressing rollers, and at the same time, disengaging said pressing rollers from drive means whereby safe cleaning opportunities are maximized.

7. A method for extracting aloe vera gel from within fibrous husks of aloe vera leaves said method comprising the following steps;

washing the harvested aloe vera leaves;

trimming the ends of the aloe vera leaves;

feeding washed and trimmed aloe vera leaves to and through a blade whereby the leaves are longitudinally bisected to expose the gel over entire length of each leaf;

pressing the longitudinally bisected leaves in paired pressing rollers which advance the husks through the rollers but do not pass the gel;

collecting the gel separated from said husks at said pressing rollers into a collection pan;

collecting said husks for disposal and carrying said husks to collection facilities on a husk collection conveyor moving beneath the length of the processing equipment, said husk collector conveyor moving beneath the collection pan within a raised trough recessed in the bottom thereof; and frequently cleaning the processing equipment by swinging a hinged block upon which said pressing rollers are rotatably mounted away from said blade thereby permitting access to the blade and the pressing rollers, and at the same time, disengaging said pressing rollers from drive means whereby safe cleaning opportunities are maximized.

* * * * *